(12) United States Patent
Liang et al.

(10) Patent No.: US 12,537,651 B2
(45) Date of Patent: Jan. 27, 2026

(54) SCHEDULING REQUEST CONFIGURATION METHOD, TERMINAL, AND NETWORK DEVICE

(71) Applicant: VIVO MOBILE COMMUNICATION CO., LTD., Guangdong (CN)

(72) Inventors: Jing Liang, Guangdong (CN); Xiaodong Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 590 days.

(21) Appl. No.: 17/955,157

(22) Filed: Sep. 28, 2022

(65) Prior Publication Data

US 2023/0020339 A1   Jan. 19, 2023

Related U.S. Application Data

(63) Continuation of application No. PCT/CN2021/083916, filed on Mar. 30, 2021.

(30) Foreign Application Priority Data

Apr. 2, 2020  (CN) .......................... 202010256269.1

(51) Int. Cl.
H04L 5/00  (2006.01)
(52) U.S. Cl.
CPC .................................. *H04L 5/0053* (2013.01)
(58) Field of Classification Search
None
See application file for complete search history.

(56) References Cited

U.S. PATENT DOCUMENTS

2014/0198736 A1* 7/2014 Shukair ............... H04W 52/146
370/329
2016/0381671 A1* 12/2016 Bagayoko ............. H04W 24/10
370/329

(Continued)

FOREIGN PATENT DOCUMENTS

| CN | 109041245 A | 12/2018 |
| CN | 109788572 A | 5/2019 |
| CN | 110225599 A | 9/2019 |

OTHER PUBLICATIONS

LG Electronics Inc. ""[Offline Disc#704] Identified Proposals to V2X MAC"" 3GPP TSG-RAN WG2 #109-e R2-2001968, Mar. 11, 2020 (Mar. 11, 2020), pp. 1-13.

(Continued)

*Primary Examiner* — Otis L Thompson, Jr.
(74) *Attorney, Agent, or Firm* — Fredrikson & Byron, P.A.

(57) ABSTRACT

Embodiments of the present disclosure provide a scheduling request configuration method, a terminal, and a network device, and relate to the field of communication technologies. The scheduling request configuration method includes: receiving configuration information from a network device, where the configuration information includes that CSI reports of multiple unicast connections of the terminal correspond to one SR configuration, and the one SR configuration corresponds to one or more SR counters; and/or, the configuration information includes that the CSI reports of the multiple unicast connections of the terminal correspond to multiple SR configurations, and the multiple SR configurations correspond to multiple SR counters.

20 Claims, 2 Drawing Sheets

Receive configuration information from a network device — 101

(56) References Cited

U.S. PATENT DOCUMENTS

| | | | |
|---|---|---|---|
| 2018/0242357 A1* | 8/2018 | Khirallah | H04L 1/1896 |
| 2018/0352567 A1 | 12/2018 | Ye et al. | |
| 2019/0200363 A1* | 6/2019 | Rajendran | H04W 52/50 |
| 2020/0221495 A1* | 7/2020 | Chen | H04W 36/00837 |
| 2020/0281022 A1* | 9/2020 | Pelletier | H04W 72/0453 |
| 2021/0006362 A1* | 1/2021 | Loehr | H04L 1/1819 |
| 2021/0051653 A1* | 2/2021 | Park | H04W 8/22 |
| 2021/0135928 A1* | 5/2021 | Yi | H04W 72/23 |
| 2021/0185614 A1* | 6/2021 | Zhou | H04W 52/0225 |
| 2021/0195613 A1* | 6/2021 | Agiwal | H04L 5/0057 |
| 2021/0227464 A1* | 7/2021 | Kung | H04W 76/14 |
| 2021/0282187 A1* | 9/2021 | Agiwal | H04W 74/0841 |
| 2021/0321425 A1* | 10/2021 | Ohta | H04W 28/02 |
| 2022/0183030 A1 | 6/2022 | Lee | H04L 5/0053 |
| 2022/0217743 A1* | 7/2022 | Zhou | H04W 28/0278 |
| 2022/0225290 A1* | 7/2022 | Ganesan | H04W 72/02 |
| 2022/0232408 A1* | 7/2022 | Lee | H04W 24/10 |
| 2022/0264651 A1* | 8/2022 | Lou | H04W 74/004 |

OTHER PUBLICATIONS

Hua Wei et al. ""Further Discussion on the Sidelink CSI Reporting Related Issues"" 3GPP TSG-RAN WG2 Meeting# 109 electronic R2-200071 I, Feb. 14, 2020 (Feb. 14, 2020), sections 1-3.

LG Electronics Inc. ""Introduction of 5G V2X with NR Sidelink"" 3GPP TSG-RAN WG2 Meeting #109-e R2-2001969, Mar. 11, 2020 (Mar. 11, 2020), pp. 1-38.

International Patent Application No. PCT/CN2021/083916, International Search Report and Written Opinion with Partial English Machine Translation mailed Jun. 21, 2021, 8 pages.

* cited by examiner

SCHEDULING REQUEST CONFIGURATION METHOD, TERMINAL, AND NETWORK DEVICE

CROSS-REFERENCE TO RELATED APPLICATIONS

This application is a continuation of International Application No. PCT/CN2021/083916, filed on Mar. 30, 2021, which claims priority to Chinese Patent Application No. 202010256269.1 filed on Apr. 2, 2020, which are incorporated herein by reference in their entireties.

TECHNICAL FIELD

The present disclosure relates to the field of communication technologies, and in particular, to a scheduling request configuration method, a terminal, and a network device.

BACKGROUND

At present, in sidelink communication, two terminals are supported to establish a unicast connection. A channel state information (CSI) report can be fed back to a transmitting terminal by a receiving terminal on the sidelink. When the receiving terminal does not have a corresponding sidelink resource, a scheduling request (SR) process is triggered. However, since the receiving terminal may have multiple unicast connections, how to correctly trigger an SR based on the multiple unicast connections is an urgent problem to be resolved at present.

SUMMARY

Embodiments of the present disclosure provide a scheduling request configuration method, a terminal, and a network device.

According to a first aspect of the present disclosure, a scheduling request configuration method, applied to a terminal, is provided, which includes:
  receiving configuration information from a network device,
  where the configuration information includes that channel state information CSI reports of multiple unicast connections of the terminal correspond to one SR configuration, and the one SR configuration corresponds to multiple SR counters, or, the one SR configuration corresponds to one SR counter;
  and/or, the configuration information includes that the CSI reports of the multiple unicast connections of the terminal correspond to multiple SR configurations, and the multiple SR configurations correspond to multiple SR counters.

According to a second aspect of the present disclosure, a scheduling request configuration method, applied to a network device, is provided, which includes:
  transmitting configuration information to a terminal,
  where the configuration information includes that CSI reports of multiple unicast connections of the terminal correspond to one SR configuration, and the one SR configuration corresponds to multiple SR counters, or, the one SR configuration corresponds to one SR counter;
  and/or, the configuration information includes that the CSI reports of the multiple unicast connections of the terminal correspond to multiple SR configurations, and the multiple SR configurations correspond to multiple SR counters.

According to a third aspect of the present disclosure, a terminal is provided, which includes:
  a receiving module, configured to receive configuration information from a network device,
  where the configuration information includes that CSI reports of multiple unicast connections of the terminal correspond to one SR configuration, and the one SR configuration corresponds to multiple SR counters, or, the one SR configuration corresponds to one SR counter;
  and/or, the configuration information includes that the CSI reports of the multiple unicast connections of the terminal correspond to multiple SR configurations, and the multiple SR configurations correspond to multiple SR counters.

According to a fourth aspect of the present disclosure, a network device is provided, which includes:
  a transmission module, configured to transmit configuration information to a terminal,
  where the configuration information includes that CSI reports of multiple unicast connections of the terminal correspond to one SR configuration, and the one SR configuration corresponds to multiple SR counters, or, the one SR configuration corresponds to one SR counter;
  and/or, the configuration information includes that the CSI reports of the multiple unicast connections of the terminal correspond to multiple SR configurations, and the multiple SR configurations correspond to multiple SR counters.

According to a fifth aspect of the present disclosure, a communication device is provided, which includes a memory, a processor, and a computer program stored in the memory and executable on the processor, where the computer program, when executed by the processor, implements the steps of the foregoing scheduling request configuration method. The communication device may be optionally a terminal or a network device.

According to a sixth aspect of the present disclosure, a computer-readable storage medium storing a computer program is provided, where the computer program, when executed by a processor, implements the steps of the foregoing scheduling request configuration method.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
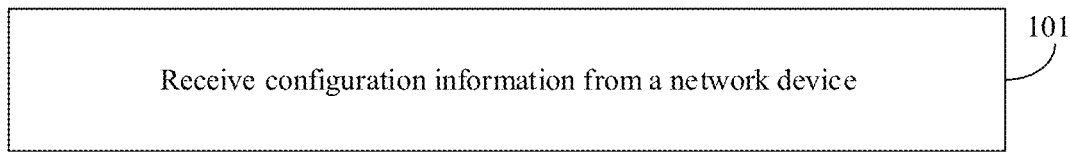
FIG. 1 is a flowchart of a scheduling request configuration method according to an embodiment of the present disclosure.

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

The specification and claims of this application, and terms "first" and "second" are used to distinguish similar objects, but are unnecessarily used to describe a specific sequence or order. It may be understood that the data used in such a way is interchangeable in proper circumstances, so that the embodiments of this application described herein can be implemented in other sequences than the sequence illustrated or described herein. In addition, the terms "comprise", "include", and any other variants thereof mean to cover the non-exclusive inclusion. For example, a process, method, system, product, or device that includes a list of steps or units is not necessarily limited to those expressly listed steps or units, but may include other steps or units not expressly listed or inherent to such a process, method, product, or device. "And/or" used in this specification and the claims represents at least one of the connected objects.

A wireless communication system in the embodiments of the present disclosure includes a terminal and a network device. The terminal may also be referred to as a terminal device or a user equipment (UE), and the terminal may be a terminal-side device such as a mobile phone, a tablet personal computer (Tablet Personal Computer), a laptop computer (Laptop Computer), a personal digital assistant (PDA), a mobile Internet device (MID), a wearable device (Wearable Device), or an in-vehicle device. It should be noted that a specific type of the terminal is not limited in the embodiments of the present disclosure. The network device may be a base station or a core network. The base station may be a base station of 5G and later versions (for example: gNB, or 5G NR NB), or a base station in another communication system (for example: an eNB, a WLAN access point, or another access point). The base station may be referred to as an access point, a base transceiver station (BTS), a radio base station, a radio transceiver, a basic service set (BSS), an extended service set (ESS), a Node B, an evolved Node B (eNB), a home Node B, a home evolved Node B, a WLAN access point, a WiFi node or some other suitable terms in the field. As long as the same technical effect is achieved, the network device is not limited to a specific technical word.

For ease of comprehension of the embodiments of the present disclosure, the following content is first described:

In sidelink communication, such as new radio (NR) sidelink communication, two terminal UEs are supported to establish a unicast (unicast) connection. When a transmitting terminal TX UE and a receiving terminal RX UE perform unicast transmission, a transmission parameter and/or a transmission solution of the TX UE may be determined according to CSI fed back by the RX UE to the TX UE. Alternatively, when the TX UE transmits a physical sidelink shared channel (PSSCH), the PSSCH can carry a channel state information-reference signal (CSI-RS). After receiving the PSSCH carrying the CSI-RS, the RX UE can calculate CSI of the corresponding channel (including at least a channel quality indicator (CQI) and a rank indicator (Rank Indicator, RI)), and then feed back the CSI to the TX UE.

Two resource allocation modes are defined in the NR sidelink communication. One is mode1, in which the base station schedules resources, and the other is mode2, in which the UE decides resources used for transmission. In this case, resource information may be from a broadcast message of the base station or pre-configured. If the UE operates within a range of the base station and has a radio resource control (RRC) connection with the base station, the UE can be in mode1 and/or mode2. If the UE operates within the range of the base station but has no RRC connection with the base station, the UE can only be in mode2. If the UE operates beyond the range of the base station, the UE can only be in mode2, and performs vehicle to everything (V2X) transmission according to the pre-configured information.

For the unicast connection between two UEs, the UE first establishes a PC5-S connection on a top layer, and after the establishment is completed, triggers an access layer AS to establish a PC5-RRC connection. There is a corresponding PC5-RRC connection for each pair of layer-2 (layer-2) identifications IDs in the unicast connection.

In the NR sidelink communication, the CSI report can be fed back to the TX UE by the RX UE on the sidelink. When the RX UE is in the resource allocation mode mode1 and intends to transmit a media access control element (MAC CE) carrying the CSI report but does not have a corresponding sidelink resource, the SR is triggered. If an SR process fails, a random access channel process is initiated.

For one SR configuration (or a set of SR configurations), the network device can configure the following parameters for SR transmission: an SR ID, an SR transmission prohibiting timer, and a quantity of maximum SR transmissions. The UE can maintain the following parameter for the SR transmission: an SR counter. For the SR counter itself, it is not necessarily carried in the configuration information of the network device, but is maintained by the terminal itself. A value of the SR counter can be configured by a protocol agreement or the network device such as the base station.

FIG. 1 is a flowchart of a scheduling request configuration method according to an embodiment of the present disclosure. The method is applied to a terminal. As shown in FIG. 1, the method includes the following steps:

Step 101: Receive configuration information from a network device.

In this embodiment, the configuration information may include that CSI reports of multiple unicast connections of the terminal correspond to one SR configuration, and the one SR configuration corresponds to multiple SR counters, or, the one SR configuration corresponds to one SR counter; and/or, the configuration information includes that the CSI reports of the multiple unicast connections of the terminal correspond to multiple SR configurations, and the multiple SR configurations correspond to multiple SR counters.

It may be understood that the terminal in this embodiment may also have only one unicast connection. In this case, the configuration information received from the network device may include a correspondence between the one unicast connection and the SR configuration. For example, the one unicast connection corresponds to one SR configuration; and the one SR configuration corresponds to one SR counter.

For the terminal, one unicast connection corresponds to a pair of destination identifications destination IDs and source identifications source IDs, and multiple unicast connections correspond to multiple pairs of destination IDs and resource IDs. Based on this, that the multiple unicast connections correspond to one SR configuration can be understood as that multiple pairs of destination IDs and source IDs correspond to one SR configuration; and that the one SR configuration corresponds to multiple SR counters can be understood as each SR counter may correspond to a pair of destination ID and source ID.

The case that the CSI reports of the multiple unicast connections of the terminal correspond to multiple SR configurations may include any one of the following:

1) A CSI report of each unicast connection corresponds to a separate SR configuration. In this case, the multiple SR configurations may be the same or different.
2) A CSI report of at least one unicast connection corresponds to a separate SR configuration. For example, assuming that the multiple unicast connections include unicast connections 1, 2, 3, 4, and 5, corresponding configurations are that unicast connections 1, 2, and 3 correspond to SR configuration 1, unicast connection 4 corresponds to SR configuration 2, and unicast connection 5 corresponds to SR configuration 3.

In this embodiment of the present disclosure, the terminal can receive configuration information from the network device, where the configuration information may include that CSI reports of multiple unicast connections of the terminal correspond to one SR configuration, and the one SR configuration corresponds to one or more SR counters; and/or, the configuration information may include that the CSI reports of the multiple unicast connections of the terminal correspond to multiple SR configurations, and the multiple SR configurations correspond to multiple SR counters. Therefore, by means of the configuration information, the terminal can clarify a correspondence between the CSI reports of the multiple unicast connections of the terminal and the SR configuration as well as the SR counter, thereby correctly triggering the SR.

Optionally, in a case that the one SR configuration corresponds to multiple SR counters, the multiple SR counters are respectively used for counting successfully transmitted SRs corresponding to CSI reports of different unicast connections. Alternatively, in a cast that the one SR configuration corresponds to one SR counter, the one SR counter is used for counting successfully transmitted SRs corresponding to the CSI reports of the multiple unicast connections. Alternatively, in a case that the multiple SR configurations correspond to multiple SR counters, the multiple SR counters are respectively used for counting successfully transmitted SRs corresponding to CSI reports of different unicast connections.

Optionally, in a case that the CSI reports of the multiple unicast connections of the terminal correspond to one SR configuration, the multiple unicast connections may correspond to one transmission prohibiting timer (or may be referred to as an SR transmission prohibiting timer), and the one transmission prohibiting timer is used for any one of the following:

1) Start the transmission prohibiting timer after an SR of any one unicast connection is successfully transmitted, and when the transmission prohibiting timer runs, prohibit transmitting an SR corresponding to the unicast connection.
2) Start the transmission prohibiting timer after an SR of any one unicast connection is successfully transmitted, and when the transmission prohibiting timer runs, prohibit transmitting SRs corresponding to all unicast connections.
3) Start the transmission prohibiting timer after an SR of a predetermined unicast connection (for example, a specific unicast connection) is successfully transmitted, and when the transmission prohibiting timer runs, prohibit transmitting an SR corresponding to the predetermined unicast connection.
4) Start the transmission prohibiting timer after an SR of a predetermined unicast connection (for example, a specific unicast connection) is successfully transmitted, and when the transmission prohibiting timer runs, prohibit transmitting SRs corresponding to all unicast connections.

Optionally, in a case that the CSI reports of the multiple unicast connections of the terminal correspond to multiple SR configurations, each unicast connection may correspond to a transmission prohibiting timer, where after an SR of a first unicast connection is successfully transmitted, a first transmission prohibiting timer corresponding to the first unicast connection is started, and when the first transmission prohibiting timer runs, an SR corresponding to the first unicast connection is prohibited from being transmitted, or, SRs corresponding to all unicast connections are prohibited from being transmitted, where the first unicast connection is optionally any one of the multiple unicast connections.

As an optional implementation, the terminal may perform a first operation in a first case. The first case may include any one of the following:

the one SR configuration corresponds to multiple SR counters, and a value of at least one of the multiple SR counters is greater than or equal to a quantity of maximum SR transmissions in a corresponding SR configuration;

the one SR configuration corresponds to one SR counter, and a value of one SR counter is greater than or equal to a quantity of maximum SR transmissions in a corresponding SR configuration; or the multiple SR configurations correspond to multiple SR counters, and a value of at least one of the multiple SR counters is greater than or equal to a quantity of maximum SR transmissions in a corresponding SR configuration.

The first operation may include at least one of the following:

switching a resource allocation mode of the terminal into a terminal autonomous selection mode; for example, the terminal can be switched into a resource allocation mode mode1; in this case, the terminal can use a resource determined by itself to transmit a CSI report;

switching a resource allocation mode of the terminal into a coexistence mode of a network scheduling mode and a terminal autonomous selection mode; for example, the terminal can be switched into the coexistence mode of the resource allocation modes mode1 and mode2; in this case, the terminal can use a resource determined by itself or a resource scheduled by the network device (for example, a base station) to transmit a CSI report;

using a system message or a resource pool in RRC dedicated signaling to transmit a CSI report;

transmitting indication information to the network device, where the indication information is used for indicating that a value of the at least one SR counter is greater than or equal to a quantity of maximum SR transmissions in a corresponding SR configuration, or indicating that a value of the one SR counter is greater than or equal to a quantity of maximum SR transmissions in a corresponding SR configuration; optionally, a sidelinkUEinformation process may be triggered and the indication information may be put into a corresponding message;

triggering a random access channel (RACH) process and canceling all suspending SRs of the multiple unicast connections;

clearing a resource of a sidelink configured grant type 1 and/or a sidelink configured grant type 2 for transmitting a CSI report; for example, clearing all resources of the configured grant type 1 and/or the configured grant type 2 for transmitting the CSI report; or using the resource of the sidelink configured grant type 1 and/or the sidelink configured grant type 2 to transmit the CSI report.

The resource of the sidelink configured grant type 1 refers to a resource configured by the network device such as the base station to the terminal through RRC signaling for sidelink communication. When the configuration is activated, the terminal can directly use the resource. A resource cycle of the resource of the sidelink configured grant type 2 is defined by the network device such as the base station through the RRC signaling, and the resource needs to be activated or deactivated by a physical downlink Control Channel (PDCCH). The terminal can use the resource only after the resource is activated.

As an optional implementation, in a second case, the terminal may perform the following operations: triggering a RACH process and canceling a suspending (suspending) SR of a unicast connection corresponding to a first SR counter, where a value of the first SR counter is greater than or equal to a quantity of maximum SR transmissions in a corresponding SR configuration. That is, if a value of a specific SR counter is greater than or equal to a quantity of maximum SR transmissions in a corresponding SR configuration, a RACH process is triggered and a suspending SR of a PC5-RRC connection corresponding to the SR counter is canceled.

The second case may include any one of the following:

the one SR configuration corresponds to multiple SR counters, and a value of at least one of the multiple SR counters is greater than or equal to a quantity of maximum SR transmissions in a corresponding SR configuration; or the multiple SR configurations correspond to multiple SR counters, and a value of at least one of the multiple SR counters is greater than or equal to a quantity of maximum SR transmissions in a corresponding SR configuration.

It should be noted that, in this embodiment, one SR configuration may include only one quantity of maximum SR transmissions and one transmission prohibiting timer. However, if multiple quantities of maximum SR transmissions are configured in one SR configuration, when the one SR configuration corresponds to multiple SR counters, a value of each SR counter corresponds to one quantity of maximum SR transmissions in the SR configuration, which is similar to the case of multiple quantities of maximum SR transmissions in multiple SR configurations. However, if multiple transmission prohibiting timers are configured in one SR configuration, when the one SR configuration corresponds to multiple unicast connections, each unicast connection may correspond to one transmission prohibiting timer in the SR configuration, which is similar to the case that multiple unicast connections correspond to multiple SR configurations (each of which includes one transmission prohibiting timer). In addition, when only one transmission prohibiting timer is configured in one SR configuration, it may also be understood that there is only one duration configuration of the transmission prohibiting timer, and the terminal can still trigger multiple transmission prohibiting timers. For example, the terminal triggers a new transmission prohibiting timer after an SR is successfully transmitted by each unicast connection, which is similar to the case that multiple unicast connections correspond to multiple SR configurations (each of which includes one transmission prohibiting timer).

In this embodiment of the present disclosure, the terminal may cancel the SR based on a timer mechanism. Optionally, if a timer is started when a first CSI report is triggered, the first CSI report may correspond to any unicast connection of the terminal. When the timer expires, the terminal may further perform any one of the following:

in a case that a MAC CE of the first CSI report has been generated, canceling the first CSI report and clearing the MAC CE of the first CSI report; or in a case that no MAC CE of the first CSI report has been generated, performing at least one of the following: canceling the first CSI report, canceling an SR triggered by the first CSI report, or canceling a RACH process triggered by a suspending SR corresponding to the first CSI report.

In this way, by means of a cancellation process of the SR, power consumption of the terminal can be reduced.

This application is further described in detail below with the aid of specific examples.

EXAMPLE 1

In this example 1, CSI reports of multiple unicast connections of a UE corresponds to one SR configuration, and the one SR configuration corresponds to multiple SR counters. In this case, a corresponding SR configuration and transmission process may include:

S1: A network device, such as a base station, configures a mapping relationship between the CSI report and the SR configuration for the UE, and a PC5-RRC connection corresponding to the CSI report can be mapped to the SR configuration, where multiple PC5-RRC connections correspond to one SR configuration. In this case, the CSI report transmitted to any destination identification (destination ID) uses the same SR configuration.

S2: A UE-1 may have PC5-RRC connections with multiple UEs, which corresponds to that different destination IDs are required during transmission of data or the CSI report.

When the UE receives an SCI-1 of a TX UE-1 and triggers transmission of the CSI report, and the CSI report has not been canceled, for a destination-1 of the TX UE-1, an SR-1 is triggered when there is no SL resource (that is, sidelink resource) that can be used to transmit the CSI report. After the SR-1 is triggered, the SR-1 becomes a suspending SR-1 until the SR-1 is canceled. The SR configuration used in this case is an SR configuration 1.

Similarly, when the UE receives an SCI-2 of a TX UE-2, and triggers transmission of the CSI report, and the CSI report has not been canceled, for a destination-2 of the TX UE-2, an SR-2 is triggered when there is no SL resource that can be used to transmit the CSI report. After the SR-2 is triggered, the SR-2 becomes a suspending SR-2 until the SR-2 is canceled. The SR configuration used in this case is still the SR configuration 1.

In this case, the UE maintains several different SR counters for different destination IDs (that is, different PC5-RRC connections). For example, after the suspending SR-1 is successfully transmitted, a counter 1 is increased by one; and after the suspending SR-2 is successfully transmitted, a counter 2 is increased by one, but the counter 1 is not increased.

In this example 1, when a value of at least one counter is greater than or equal to a quantity of maximum SR transmissions in a corresponding SR configuration, the UE selectively performs the first operation and/or the second operation as described above.

EXAMPLE 2

In this example 2, CSI reports of multiple unicast connections of a UE corresponds to one SR configuration, and the one SR configuration corresponds to one SR counter. In this case, a corresponding SR configuration and transmission process may include:
- S1: A base station configures a mapping relationship between the CSI report and the SR configuration for the UE, and a PC5-RRC connection corresponding to the CSI report can be mapped to the SR configuration, where multiple PC5-RRC connections correspond to one SR configuration. In this case, the CSI report transmitted to any destination identification (destination ID) uses the same SR configuration.
- S2: A UE-1 may have PC5-RRC connections with multiple UEs, which corresponds to that different destination IDs are required during transmission of data or the CSI report.

When the UE receives an SCI-1 of a TX UE-1, and triggers transmission of the CSI report, and the CSI report has not been canceled, for a destination-1 of the TX UE-1, an SR-1 is triggered when there is no SL resource that can be used to transmit the CSI report. After the SR-1 is triggered, the SR-1 becomes a suspending SR-1 until the SR-1 is canceled. The SR configuration used in this case is an SR configuration 1.

Similarly, when the UE receives an SCI-2 of a TX UE-2, and triggers transmission of the CSI report, and the CSI report has not been canceled, for a destination-2 of the TX UE-2, an SR-2 is triggered when there is no SL resource that can be used to transmit the CSI report. After the SR-2 is triggered, the SR-2 becomes a suspending SR-2 until the SR-2 is canceled. The SR configuration used in this case is still the SR configuration 1.

In this case, the UE maintains the same SR counter for the multiple PC5-RRC connections. For example, destination IDs 3, 4 and 5 all correspond to an SR counter 3. When the CSI report is transmitted to the destination ID 3, 4 or 5, the SR counter 3 is increased by one, and if the CSI report is not transmitted to the destination ID 3, 4 or 5, the SR counter 3 is not increased.

In this example 2, when a value of the one counter is greater than or equal to a quantity of maximum SR transmissions in a corresponding SR configuration, the UE selectively performs the first operation as described above.

EXAMPLE 3

In this example 3, CSI reports of multiple unicast connections of a UE corresponds to multiple SR configurations, and the multiple SR configurations correspond to multiple SR counters, that is, each SR configuration respectively corresponds to one SR counter. In this case, a corresponding SR configuration and transmission process may include:
- S1: A base station configures a mapping relationship between the CSI report and the SR configuration for the UE, and a PC5-RRC connection corresponding to the CSI report can be mapped to the SR configuration, where multiple PC5-RRC connections correspond to the multiple SR configurations.
- S2: A UE-1 may have PC5-RRC connections with multiple UEs, which corresponds to that different destination IDs are required during transmission of data or the CSI report.

When the UE receives an SCI-1 of a TX UE-1, and triggers transmission of the CSI report, and the CSI report has not been canceled, for a destination-1 of the TX UE-1, an SR-1 is triggered when there is no SL resource that can be used to transmit the CSI report. After the SR-1 is triggered, the SR-1 becomes a suspending SR-1 until the SR-1 is canceled. The SR configuration used in this case is an SR configuration 1.

Similarly, when the UE receives an SCI-2 of a TX UE-2, and triggers transmission of the CSI report, and the CSI report has not been canceled, for a destination-2 of the TX UE-2, an SR-2 is triggered when there is no SL resource that can be used to transmit the CSI report. After the SR-2 is triggered, the SR-2 becomes a suspending SR-2 until the SR-2 is canceled. The SR configuration used in this case is an SR configuration 2.

In this case, the UE maintains several different SR counters for different SR configurations (that is, different PC5-RRC connections). For example, after the suspending SR-1 is successfully transmitted, a counter 1 is increased by one; and after the suspending SR-2 is successfully transmitted, a counter 2 is increased by one, but the counter 1 is not increased.

In this example 3, when a value of at least one counter is greater than or equal to a quantity of maximum SR transmissions in a corresponding SR configuration, the UE selectively performs the first operation and/or the second operation as described above.

Figure 2:
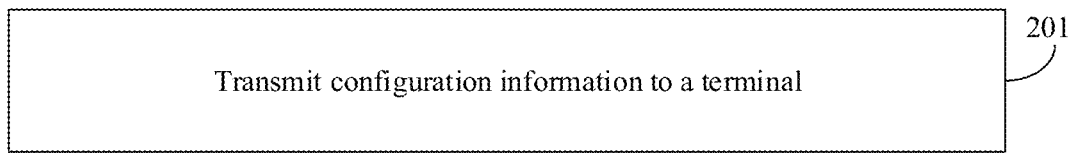
FIG. 2 is a flowchart of another scheduling request configuration method according to an embodiment of the present disclosure.

FIG. 2 is a flowchart of a scheduling request configuration method according to an embodiment of the present disclosure. The method is applied to a network device. As shown in FIG. 2, the method includes the following steps:

Step 201: Transmit configuration information to a terminal.

The configuration information includes that CSI reports of multiple unicast connections of the terminal correspond to one SR configuration, and the one SR configuration corresponds to multiple SR counters, or, the one SR configuration corresponds to one SR counter; and/or, the configuration information includes that the CSI reports of the multiple unicast connections of the terminal correspond to multiple SR configurations, and the multiple SR configurations correspond to multiple SR counters.

In this embodiment of the present disclosure, the terminal can clarify a correspondence between the CSI reports of multiple unicast connections of the terminal and the SR configuration as well as the SR counter, thereby correctly triggering the SR.

Optionally, in a case that the one SR configuration corresponds to multiple SR counters, the multiple SR counters are respectively used for counting successfully transmitted SRs corresponding to CSIs report of different unicast connections;

or, in a case that the one SR configuration corresponds to one SR counter, the one SR counter is used for counting successfully transmitted SRs corresponding to the CSI reports of the multiple unicast connections;

or, in a case that the multiple SR configurations correspond to multiple SR counters, the multiple SR counters are respectively used for counting successfully transmitted SRs corresponding to CSI reports of different unicast connections.

Optionally, the case that the CSI reports of the multiple unicast connections of the terminal correspond to multiple SR configurations includes any one of the following:
  a CSI report of each unicast connection corresponds to a separate SR configuration; or
  a CSI report of at least one unicast connection corresponds to a separate SR configuration.

Optionally, in a case that the CSI report of the multiple unicast connections of the terminal corresponding to one SR configuration, the multiple unicast connections corresponding to one transmission prohibiting timer, and the one transmission prohibiting timer is used for any one of the following:
  starting the transmission prohibiting timer after an SR of any one unicast connection is successfully transmitted, and when the transmission prohibiting timer runs, prohibiting transmitting an SR corresponding to the unicast connection;
  starting the transmission prohibiting timer after an SR of any one unicast connection is successfully transmitted, and when the transmission prohibiting timer runs, prohibiting transmitting SRs corresponding to all unicast connections;
  starting the transmission prohibiting timer after an SR of a predetermined unicast connection is successfully transmitted, and when the transmission prohibiting timer runs, prohibiting transmitting an SR corresponding to the predetermined unicast connection;
  starting the transmission prohibiting timer after an SR of a predetermined unicast connection is successfully transmitted, and when the transmission prohibiting timer runs, prohibiting transmitting SRs corresponding to all unicast connection.
  and/or, in a case that the CSI reports of the multiple unicast connections of the terminal correspond to multiple SR configurations, each unicast connection corresponds to a transmission prohibiting timer, where after an SR of a first unicast connection is successfully transmitted, a first transmission prohibiting timer corresponding to the first unicast connection is started, and when the first transmission prohibiting timer runs, an SR corresponding to the first unicast connection is prohibited from being transmitted, or, SRs corresponding to all unicast connections are prohibited from being transmitted, where the first unicast connection is any one of the multiple unicast connections.

Figure 3:
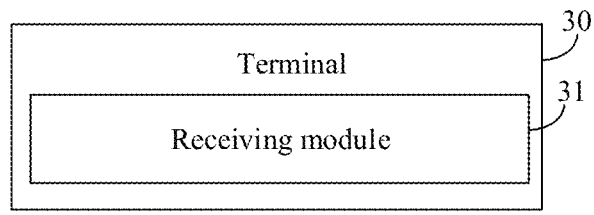
FIG. 3 is a schematic structural diagram 1 of a terminal according to an embodiment of the present disclosure.

FIG. 3 is a schematic structural diagram of a terminal according to an embodiment of the present disclosure. As shown in FIG. 3, the terminal 30 includes:
  a receiving module 31, configured to receive configuration information from a network device,
  where the configuration information includes that CSI reports of multiple unicast connections of the terminal correspond to one SR configuration, and the one SR configuration corresponds to multiple SR counters, or, the one SR configuration corresponds to one SR counter; and/or, the configuration information includes that the CSI reports of the multiple unicast connections of the terminal correspond to multiple SR configurations, and the multiple SR configurations correspond to multiple SR counters.

Optionally, in a case that the one SR configuration corresponds to multiple SR counters, the multiple SR counters are respectively used for counting successfully transmitted SRs corresponding to CSI reports of different unicast connections;
  or, in a case that the one SR configuration corresponds to one SR counter, the one SR counter is used for counting successfully transmitted SRs corresponding to the CSI reports of the multiple unicast connections;
  or, in a case that the multiple SR configurations correspond to multiple SR counters, the multiple SR counters are respectively used for counting successfully transmitted SRs corresponding to CSI reports of different unicast connections.

Optionally, the terminal 30 further includes:
  a first execution module, configured to perform a first operation in a first case,
  where the first case includes any one of the following:
  the one SR configuration corresponds to multiple SR counters, and a value of at least one of the multiple SR counters is greater than or equal to a quantity of maximum SR transmissions in a corresponding SR configuration;
  the one SR configuration corresponds to one SR counter, and a value of one SR counter is greater than or equal to a quantity of maximum SR transmissions in a corresponding SR configuration; or
  the multiple SR configurations correspond to multiple SR counters, and a value of at least one of the multiple SR counters is greater than or equal to a quantity of maximum SR transmissions in a corresponding SR configuration,
  where the first operation includes at least one of the following:
  switching a resource allocation mode of the terminal into a terminal autonomous selection mode;
  switching a resource allocation mode of the terminal into a coexistence mode of a network scheduling mode and a terminal autonomous selection mode;
  using a system message or a resource pool in RRC dedicated signaling to transmit a CSI report;
  transmitting indication information to the network device, where the indication information is used for indicating that a value of the at least one SR counter is greater than or equal to a quantity of maximum SR transmissions in a corresponding SR configuration, or indicating that a value of the one SR counter is greater than or equal to a quantity of maximum SR transmissions in a corresponding SR configuration;
  triggering a RACH process and canceling all suspending SRs of the multiple unicast connections;
  clearing a resource of a sidelink configured grant type 1 and/or a sidelink configured grant type 2 for transmitting a CSI report; or
  using the resource of the sidelink configured grant type 1 and/or the sidelink configured grant type 2 to transmit the CSI report.

Optionally, the terminal 30 further includes:
  a second execution module is configured to: in a second case, trigger a RACH process and cancel a suspending SR of a unicast connection corresponding to a first SR counter, where a value of the first SR counter is greater than or equal to a quantity of maximum SR transmissions in a corresponding SR configuration,
  where the second case includes any one of the following:
  the one SR configuration corresponds to multiple SR counters, and a value of at least one of the multiple SR counters is greater than or equal to the quantity of maximum SR transmissions in the corresponding SR configuration;

the multiple SR configurations correspond to multiple SR counters, and a value of at least one of the multiple SR counters is greater than or equal to the quantity of maximum SR transmissions in the corresponding SR configuration.

Optionally, the terminal 30 further includes:

a third execution module, configured to: if a timer has been started when the first CSI report is triggered, and when the timer expires, perform any one of the following:

in a case that a media access control control element MAC CE of the first CSI report has been generated, cancel the first CSI report and clear the MAC CE of the first CSI report; or in a case that no MAC CE of the first CSI report has been generated, perform at least one of the following: cancel the first CSI report, cancel an SR triggered by the first CSI report, or cancel a RACH process triggered by a suspending SR corresponding to the first CSI report.

Optionally, the case that the CSI reports of the multiple unicast connections of the terminal correspond to multiple SR configurations includes any one of the following:

a CSI report of each unicast connection corresponds to a separate SR configuration; or a CSI report of at least one unicast connection corresponds to a separate SR configuration.

Optionally, in a case that the CSI reports of the multiple unicast connections of the terminal correspond to one SR configuration, the multiple unicast connections correspond to one transmission prohibiting timer, and the one transmission prohibiting timer is used for any one of the following:

starting the transmission prohibiting timer after an SR of any one unicast connection is successfully transmitted, and when the transmission prohibiting timer runs, prohibiting transmitting an SR corresponding to the unicast connection;

starting the transmission prohibiting timer after an SR of any one unicast connection is successfully transmitted, and when the transmission prohibiting timer runs, prohibiting transmitting SRs corresponding to all unicast connections;

starting the transmission prohibiting timer after an SR of a predetermined unicast connection is successfully transmitted, and when the transmission prohibiting timer runs, prohibiting transmitting an SR corresponding to the predetermined unicast connection; or starting the transmission prohibiting timer after an SR of a predetermined unicast connection is successfully transmitted, and when the transmission prohibiting timer runs, prohibiting transmitting SRs corresponding to all unicast connections; and/or, in a case that the CSI reports of the multiple unicast connections of the terminal correspond to multiple SR configurations, each unicast connection corresponds to a transmission prohibiting timer, where after an SR of a first unicast connection is successfully transmitted, a first transmission prohibiting timer corresponding to the first unicast connection is started, and when the first transmission prohibiting timer runs, an SR corresponding to the first unicast connection is prohibited from being transmitted, or, SRs corresponding to all unicast connections are prohibited from being transmitted, where the first unicast connection is any one of the multiple unicast connections.

The terminal 30 in this embodiment of the present disclosure can implement the processes implemented in the foregoing method embodiment shown in FIG. 1 and achieve the same beneficial effects. To avoid repetition, details are not described herein again.

Figure 4:
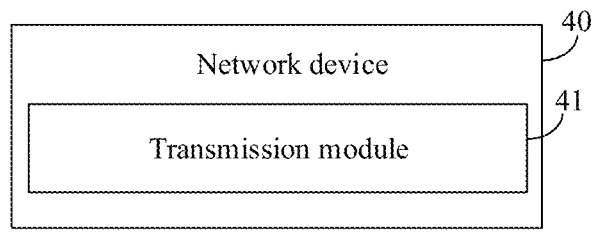
FIG. 4 is a schematic structural diagram 1 of a network device according to an embodiment of the present disclosure.

FIG. 4 is a schematic structural diagram of a network device according to an embodiment of the present disclosure. As shown in FIG. 4, the network device 40 includes:

a transmission module 41, configured to transmit configuration information to a terminal, where the configuration information includes that CSI reports of multiple unicast connections of the terminal correspond to one SR configuration, and the one SR configuration corresponds to multiple SR counters, or, the one SR configuration corresponds to one SR counter; and/or, the configuration information includes that the CSI reports of the multiple unicast connections of the terminal correspond to multiple SR configurations, and the multiple SR configurations correspond to multiple SR counters.

Optionally, in a case that the one SR configuration corresponds to multiple SR counters, the multiple SR counters are respectively used for counting successfully transmitted SRs corresponding to CSI reports of different unicast connections;

or, in a case that the one SR configuration corresponds to one SR counter, the one SR counter is used for counting successfully transmitted SRs corresponding to the CSI reports of the multiple unicast connections;

or, in a case that the multiple SR configurations correspond to multiple SR counters, the multiple SR counters are respectively used for counting successfully transmitted SRs corresponding to CSI reports of different unicast connections Optionally, the case that the CSI reports of the multiple unicast connections of the terminal correspond to multiple SR configurations includes any one of the following:

a CSI report of each unicast connection corresponds to a separate SR configuration; or a CSI report of at least one unicast connection corresponds to a separate SR configuration.

Optionally, in a case that the CSI reports of the multiple unicast connections of the terminal correspond to one SR configuration, the multiple unicast connections correspond to one transmission prohibiting timer, and the one transmission prohibiting timer is used for any one of the following:

starting the transmission prohibiting timer after an SR of any one unicast connection is successfully transmitted, and when the transmission prohibiting timer runs, prohibiting transmitting an SR corresponding to the unicast connection;

starting the transmission prohibiting timer after an SR of any one unicast connection is successfully transmitted, and when the transmission prohibiting timer runs, prohibiting transmitting SRs corresponding to all unicast connections starting the transmission prohibiting timer after an SR of a predetermined unicast connection is successfully transmitted, and when the transmission prohibiting timer runs, prohibiting transmitting an SR corresponding to the predetermined unicast connection; or starting the transmission prohibiting timer after an SR of a predetermined unicast connection is successfully transmitted, and when the transmission prohibiting timer runs, prohibiting transmitting SRs corresponding to all unicast connections;

and/or, in a case that the CSI reports of the multiple unicast connections of the terminal correspond to multiple SR configurations, each unicast connection corresponds to a transmission prohibiting timer, where after an SR of a first unicast connection is successfully transmitted, a first transmission prohibiting timer corresponding to the first unicast connection is started, and when the first transmission prohibiting timer runs, an SR corresponding to the first unicast connection is prohibited from being transmitted, or, SRs corresponding to all unicast connections are prohibited from being transmitted, where the first unicast connection is any one of the multiple unicast connections.

The network device 40 in this embodiment of the present disclosure can implement the processes implemented in the foregoing method embodiment shown in FIG. 2 and achieve the same beneficial effects. To avoid repetition, details are not described herein again.

An embodiment of the present disclosure further provides a communication device, including a processor, a memory, and a computer program stored in the memory and executable on the processor, where the computer program, when executed by the processor, can implement the processes of the embodiments of the foregoing scheduling request configuration method, and can achieve the same technical effects. To avoid repetition, details are not described herein again.

Figure 5:
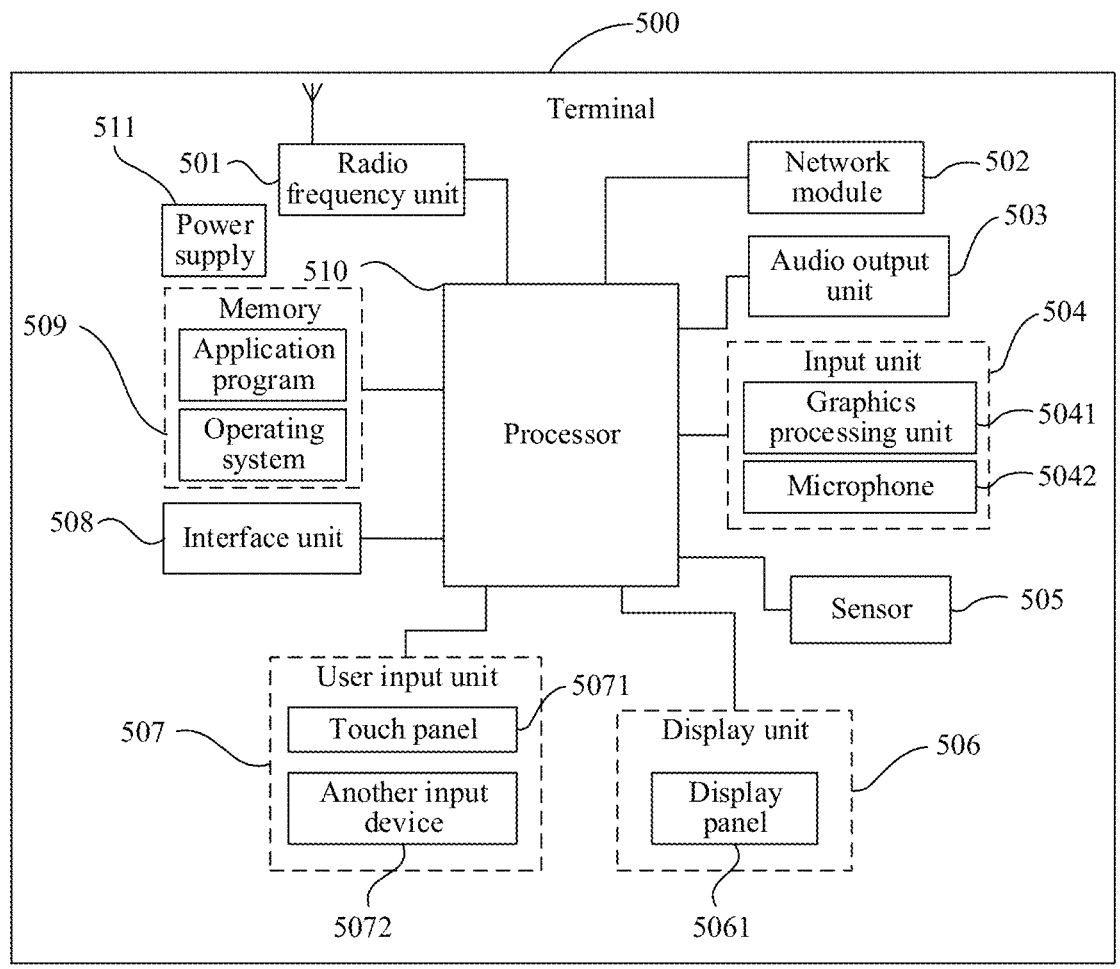
FIG. 5 is a schematic structural diagram 2 of a terminal according to an embodiment of the present disclosure.

FIG. 5 is a schematic diagram of a hardware structure of a terminal according to an embodiment of the present disclosure. The terminal 500 includes, but is not limited to, components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that the terminal structure shown in FIG. 5 does not constitute a limitation on the terminal, and the terminal may include more or fewer components than shown, or combine some components, or have different component arrangements. In the embodiments of the present disclosure, the terminal includes, but is not limited to, a mobile phone, a tablet computer, a notebook computer, a handheld computer, an in-vehicle terminal, a wearable device, a pedometer, and the like.

The radio frequency unit 501, configured to receive configuration information from a network device, where the configuration information includes that CSI reports of multiple unicast connections of the terminal correspond to one SR configuration, and the one SR configuration corresponds to multiple SR counters; or the one SR configuration corresponds to one SR counter; and/or, the configuration information includes that the CSI reports of the multiple unicast connections of the terminal correspond to multiple SR configurations, and the multiple SR configurations correspond to multiple SR counters.

The terminal 500 in this embodiment of the present disclosure can implement the processes implemented in the foregoing method embodiment shown in FIG. 1 and achieve the same beneficial effects. To avoid repetition, details are not described herein again.

It should be understood that, in this embodiment of the present disclosure, the radio frequency unit 501 may be configured to receive and transmit signals in a process of receiving and transmitting information or calls, to receive downlink data from a base station, then transmit the downlink data to the processor 510 for processing, and additionally, transmit uplink data to the base station. Generally, the radio frequency unit 501 includes, but is not limited to, an antenna, at least one amplifier, a transceiver, a coupler, a low noise amplifier, a duplexer, and the like. In addition, the radio frequency unit 501 may further communicate with a network and other devices via a wireless communication system.

The terminal provides wireless broadband Internet access for a user by using the network module 502, for example, helps the user to receive or transmit an email, browse a webpage, access stream media, and the like.

The audio output unit 503 may switch audio data received by the radio frequency unit 501 or the network module 502 or audio data stored in the memory 509 into an audio signal and output the audio signal as sound. Moreover, the audio output unit 503 may further provide an audio output (such as call signal receiving sound or message receiving sound) related to a specific function executed by the terminal 500. The audio output unit 503 includes a speaker, a buzzer, a receiver, and the like.

The input unit 504 is configured to receive an audio or video signal. The input unit 504 may include a graphics processing unit (Graphics Processing Unit, GPU) 5041 and a microphone 5042, and the graphics processing unit 5041 processes image data of still images or videos obtained by an image capture device (for example, a camera) in a video capture mode or an image capture mode. The processed image frames may be displayed on the display unit 506. Image frames processed by the graphics processing unit 5041 may be stored in the memory 509 (or another storage medium) or transmitted via the radio frequency unit 501 or the network module 502. The microphone 5042 may receive sound and be able to process such sound as audio data. The processed audio data may be switched to a format output that can be sent to a mobile communication base station via the radio frequency unit 501 in a telephone call mode.

The terminal 500 may further include at least one sensor 505, such as an optical sensor, a motion sensor, and other sensors. Alternatively, the optical sensor may include an ambient light sensor and a proximity sensor. The ambient light sensor may adjust luminance of the display panel 5061 according to brightness of the ambient light. The proximity sensor may switch off the display panel 5061 and/or backlight when the terminal 500 is moved to the ear. As one type of motion sensor, an acceleration sensor may detect magnitude of accelerations in various directions (which generally are triaxial), may detect magnitude and a direction of the gravity when static, and may be configured to identify a terminal attitude (such as switchover between horizontal and vertical screens, a related game, and attitude calibration of a magnetometer), a related function of vibration identification (such as a pedometer and a knock); and the sensor 505 may further comprise a fingerprint sensor, a pressure sensor, an iris sensor, a molecular sensor, a gyroscope, a barometer, a hygrometer, a thermometer, an infrared sensor, etc., which are not be repeated herein.

The display unit 506 is configured to display information input by the user or information provided to the user. The display unit 506 may include the display panel 5061, and the display panel 5061 may be configured in the form of a liquid crystal display (Liquid Crystal Display, LCD), an organic light-emitting diode (Organic Light-Emitting Diode, OLED), or the like.

The input unit 507 may be configured to receive input digit or character information, and generate key signal input related to the user setting and function control of the terminal. Alternatively, the user input unit 507 includes a touch panel 5071 and another input device 5072. The touch panel 5071, also referred to as a touchscreen, may collect a touch operation of a user on or near the touch panel (such as an operation of a user on or near the touch panel 5071 by using any suitable object or attachment, such as a finger or a touch pen). The touch panel 5071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, switches the touch information into a contact coordinate, then transmits the contact coordinate to the processor 510, receives and executes a command transmitted by the processor 510. In addition, the touch panel 5071 may be implemented by using various types, such as a resistive type, a capacitive type, an infrared type, and a surface acoustic wave type. In addition to the touch panel 5071, the user input unit 507 may further include the another input device 5072. Alternatively, the another input device 5072 may include, but is not limited to, a physical keyboard, a functional key (such as a volume control key or a switch key), a track ball, a mouse, and a joystick, and details are not described herein again.

Further, the touch panel 5071 may cover the display panel 5061. After detecting a touch operation on or near the touch panel, the touch panel 5071 transfers the touch operation to the processor 510, to determine a type of a touch event. Then, the processor 510 provides a corresponding visual output on the display panel 5061 according to the type of the touch event. Although, in FIG. 5, the touch panel 5071 and the display panel 5061 are used as two independent parts to implement input and output functions of the terminal, in some embodiments, the touch panel 5071 and the display panel 5061 may be integrated to implement the input and output functions of the terminal, which are not limited herein.

The interface unit 508 is an interface for connecting an external apparatus and the terminal 500. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 508 may be configured to receive input (for example, data information or power) from an external apparatus and transmit the received input to one or more elements in the terminal 500 or may be configured to transmit data between the terminal 500 and the external apparatus.

The memory 509 may be configured to store software programs and various pieces of data. The memory 509 may mainly comprise a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 509 may include a high speed RAM, and may further include a non-volatile memory, such as at least one magnetic disk storage device, a flash memory, or other volatile solid-state storage devices.

The processor 510 is a control center of the terminal, and connects to various parts of the terminal by using various interfaces and lines. By running or executing the software program and/or module stored in the memory 509, and invoking data stored in the memory 509, the processor performs various functions and data processing of the terminal, thereby performing overall monitoring on the terminal. The processor 510 may include one or more processing units. Preferably, the processor 510 may integrate an application processor and a modem processor. The application processor mainly processes an operating system, a user interface, an application program, and the like. The modem processor mainly processes wireless communication. It can be understood that, the modem processor may not be integrated into the processor 510.

The terminal 500 may further include a power supply 511 (such as a battery) for supplying power to the components. Preferably, the power supply 511 may be logically connected to the processor 510 by using a power management system, thereby implementing functions such as charging, discharging, and power consumption management by using the power management system.

In addition, the terminal 500 may further include some functional module that are not shown, which are not described herein in detail.

Figure 6:
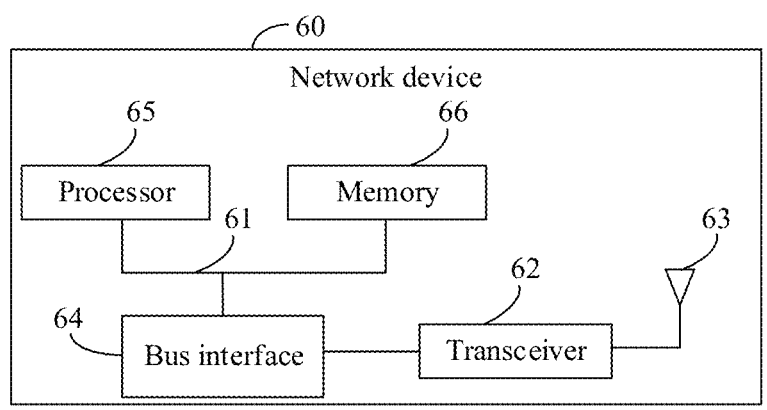
FIG. 6 is a schematic structural diagram 2 of a network device according to an embodiment of the present disclosure.

FIG. 6 is a schematic diagram of a hardware structure of a network device according to an embodiment of the present disclosure. The network device 60 includes, but is not limited to, a bus 61, a transceiver 62, an antenna 63, a bus interface 64, a processor 65, and a memory 66.

In this embodiment of the present disclosure, the network device 60 further includes: a computer program stored in the memory 66 and executable on the processor 65, where the computer program, when executed by the processor 65, implements the following steps:

transmitting configuration information to a terminal, where the configuration information includes that CSI reports of multiple unicast connections of the terminal correspond to one SR configuration, and the one SR configuration corresponds to multiple SR counters; or, the one SR configuration corresponds to one SR counter; and/or, the configuration information includes that the CSI reports of the multiple unicast connections of the terminal correspond to multiple SR configurations, and the multiple SR configurations correspond to multiple SR counters.

The transceiver 62 is configured to receive and transmit data under control of the processor 65.

The network device 60 in this embodiment of the present disclosure can implement the processes implemented in the foregoing method embodiment shown in FIG. 2 and achieve the same beneficial effects. To avoid repetition, details are not described herein again.

In FIG. 6, in a bus architecture (represented by a bus 61), the bus 61 may comprise any quantity of interconnected buses and bridges, and the bus 61 connects various circuits comprising one or more processors represented by a processor 65 and memories represented by a memory 66. The bus 61 may further connect various other circuits such as a peripheral device, a voltage stabilizer, and a power management circuit. These are known in the art, and therefore are not further described in this specification. A bus interface 64 provides an interface between the bus 61 and the transceiver 62. The transceiver 62 may be one component, or may be multiple components, such as multiple receivers and transmitters, and providing units for communicating with various other apparatuses on a transmission medium. Data processed by the processor 65 is transmitted on a wireless medium by using an antenna 63. Further, the antenna 63 further receives data and transfers the data to the processor 65.

The processor 65 is responsible for managing the bus 61 and general processing, and may provide various functions, including timing, peripheral interfacing, voltage adjustment, power management, and another control function. The memory 66 may be configured to store data used by the processor 65 when the processor 65 performs an operation.

Optionally, the processor 65 may be a CPU, an ASIC, an FPGA, or a CPLD.

The embodiments of the present disclosure further provide a computer-readable storage medium, storing a computer program, the computer program, when executed by a processor, implementing the processes of the scheduling request configuration method embodiments and achieving the same technical effects, which is not described herein again to avoid repetition. The computer-readable storage medium is, for example, a read-only memory (ROM), a random access memory (RAM), a magnetic disk, an optical disc or the like.

It may be understood that the embodiments described in the embodiments of the present disclosure may be implemented by hardware, software, firmware, middleware, microcode, or a combination thereof. For hardware implementation, modules, units, submodules and subunits may be implemented in one or more application specific integrated circuits (ASICs), a digital signal processing (DSP), a digital signal processing device (DSPD), a programmable logic device (PLD), a field-programmable gate array (FPGA), a general-purpose processor, a controller, a micro-controller, a microprocessor, and other electronic units configured to execute the functions in the present application, or a combination of the above.

It should be noted that the terms "include", "comprise", or any other variation thereof in this application is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions of the present disclosure essentially or the part contributing to the prior art may be implemented in a form of a software product. The computer software product is stored in a storage medium (for example, a ROM/RAM, a magnetic disk, or an optical disc) and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings. However, the present disclosure is not limited to the specific embodiments described above, and the specific embodiments described above are merely exemplary and not limitative. A person of ordinary skill in the art may make many forms without departing from the idea of the present disclosure and the protection scope of the claims. All of the forms shall fall within the protection of the present disclosure.

What is claimed is:

1. A scheduling request configuration method performed by a terminal, comprising:
   receiving configuration information from a network device,
   wherein the configuration information comprises that channel state information (CSI) reports of multiple unicast connections of the terminal correspond to one scheduling request (SR) configuration, and the one SR configuration corresponds to multiple SR counters, or, the one SR configuration corresponds to one SR counter; and/or
   the configuration information comprises that the CSI reports of the multiple unicast connections of the terminal correspond to multiple SR configurations, and the multiple SR configurations correspond to multiple SR counters,
   wherein the method further comprises: performing a first operation in a first case,
   wherein the first operation comprises at least one of the following:
   switching a resource allocation mode of the terminal into a terminal autonomous selection mode; or
   switching a resource allocation mode of the terminal into a coexistence mode of a network scheduling mode and a terminal autonomous selection mode;
   wherein the first case comprises any one of the following:
   the one SR configuration corresponds to multiple SR counters, and a value of at least one of the multiple SR counters is greater than or equal to a quantity of maximum SR transmissions in a corresponding SR configuration;
   the one SR configuration corresponds to one SR counter, and a value of one SR counter is greater than or equal to a quantity of maximum SR transmissions in a corresponding SR configuration; or
   the multiple SR configurations correspond to multiple SR counters, and a value of at least one of the multiple SR counters is greater than or equal to a quantity of maximum SR transmissions in a corresponding SR configuration.

2. The method according to claim 1, wherein in a case that the one SR configuration corresponds to multiple SR counters, the multiple SR counters are respectively used for counting successfully transmitted SRs corresponding to CSI reports of different unicast connections; or
   in a case that the one SR configuration corresponds to one SR counter, the one SR counter is used for counting successfully transmitted SRs corresponding to the CSI reports of the multiple unicast connections; or
   in a case that the multiple SR configurations correspond to multiple SR counters, the multiple SR counters are respectively used for counting successfully transmitted SRs corresponding to CSI reports of different unicast connections.

3. The method according to claim 1,
   wherein the first operation further comprises at least one of the following:
   using a system message or a resource pool in radio resource control RRC dedicated signaling to transmit a CSI report;
   transmitting indication information to the network device, wherein the indication information is used for indicating that a value of the at least one SR counter is greater than or equal to a quantity of maximum SR transmissions in a corresponding SR configuration, or indicating that a value of the one SR counter is greater than or equal to a quantity of maximum SR transmissions in a corresponding SR configuration;

triggering a random access channel (RACH) process and canceling all suspending SRs of the multiple unicast connections;

clearing a resource of a sidelink configured grant type 1 and/or a sidelink configured grant type 2 for transmitting a CSI report; or using the resource of the sidelink configured grant type 1 and/or the sidelink configured grant type 2 to transmit the CSI report.

4. The method according to claim 1, further comprising:

in a second case, triggering a RACH process and canceling a suspending SR of a unicast connection corresponding to a first SR counter, wherein a value of the first SR counter is greater than or equal to a quantity of maximum SR transmissions in a corresponding SR configuration, wherein the second case comprises any one of the following:

the one SR configuration corresponds to multiple SR counters, and a value of at least one of the multiple SR counters is greater than or equal to the quantity of maximum SR transmissions in the corresponding SR configuration; or the multiple SR configurations correspond to multiple SR counters, and a value of at least one of the multiple SR counters is greater than or equal to the quantity of maximum SR transmissions in the corresponding SR configuration.

5. The method according to claim 1, further comprising:

in a case that a timer has been started when a first CSI report is triggered, and when the timer expires, performing any one of the following:

in a case that a media access control control element (MAC CE) of the first CSI report has been generated, canceling the first CSI report and clearing the MAC CE of the first CSI report; or in a case that no MAC CE of the first CSI report has been generated, performing at least one of the following: canceling the first CSI report, canceling an SR triggered by the first CSI report, or canceling a RACH process triggered by a suspending SR corresponding to the first CSI report.

6. The method according to claim 1, wherein the case that the CSI reports of the multiple unicast connections of the terminal correspond to multiple SR configurations comprises any one of the following:

a CSI report of each unicast connection corresponds to a separate SR configuration; or a CSI report of at least one unicast connection corresponds to a separate SR configuration.

7. The method according to claim 1, wherein in a case that the CSI reports of the multiple unicast connections of the terminal correspond to one SR configuration, the multiple unicast connections correspond to one transmission prohibiting timer, and the one transmission prohibiting timer is used for any one of the following:

starting the transmission prohibiting timer after an SR of any one unicast connection is successfully transmitted, and when the transmission prohibiting timer runs, prohibiting transmitting an SR corresponding to the unicast connection;

starting the transmission prohibiting timer after an SR of any one unicast connection is successfully transmitted, and when the transmission prohibiting timer runs, prohibiting transmitting SRs corresponding to all unicast connections;

starting the transmission prohibiting timer after an SR of a predetermined unicast connection is successfully transmitted, and when the transmission prohibiting timer runs, prohibiting transmitting an SR corresponding to the predetermined unicast connections; or the transmission prohibiting timer is started after an SR of a predetermined unicast connection is successfully transmitted, and when the transmission prohibiting timer runs, prohibiting transmitting SRs corresponding to all unicast connections; and/or, in a case that the CSI reports of the multiple unicast connections of the terminal correspond to multiple SR configurations, each unicast connection corresponds to one transmission prohibiting timer, wherein after an SR of a first unicast connection is successfully transmitted, a first transmission prohibiting timer corresponding to the first unicast connection is started, and when the first transmission prohibiting timer runs, an SR corresponding to the first unicast connection is prohibited from being transmitted, or, SRs corresponding to all unicast connections are prohibited from being transmitted, wherein the first unicast connection is any one of the multiple unicast connections.

8. A scheduling request configuration method performed by a network device, comprising:

transmitting configuration information to a terminal, wherein the configuration information comprises that channel state information (CSI) reports of multiple unicast connections of the terminal correspond to one scheduling request (SR) configuration, and the one SR configuration corresponds to multiple SR counters, or, the one SR configuration corresponds to one SR counter; and/or, the configuration information comprises that CSI reports of multiple unicast connections of the terminal correspond to multiple SR configurations, and the multiple SR configurations correspond to multiple SR counters, wherein the configuration information is used to enable the terminal to perform a first operation in a first case, wherein the first operation comprises at least one of the following:

switching a resource allocation mode of the terminal into a terminal autonomous selection mode; or switching a resource allocation mode of the terminal into a coexistence mode of a network scheduling mode and a terminal autonomous selection mode;

wherein the first case comprises any one of the following:

the one SR configuration corresponds to multiple SR counters, and a value of at least one of the multiple SR counters is greater than or equal to a quantity of maximum SR transmissions in a corresponding SR configuration;

the one SR configuration corresponds to one SR counter, and a value of one SR counter is greater than or equal to a quantity of maximum SR transmissions in a corresponding SR configuration; or the multiple SR configurations correspond to multiple SR counters, and a value of at least one of the multiple SR counters is greater than or equal to a quantity of maximum SR transmissions in a corresponding SR configuration.

9. The method according to claim 8, wherein in a case that the one SR configuration corresponds to multiple SR counters, the multiple SR counters are respectively used for counting successfully transmitted SRs corresponding to CSI reports of different unicast connections; or,
  in a case that the one SR configuration corresponds to one SR counter, the one SR counter is used for counting successfully transmitted SRs corresponding to the CSI reports of the multiple unicast connections; or,
  in a case that the multiple SR configurations correspond to multiple SR counters, the multiple SR counters are respectively used for counting successfully transmitted SRs corresponding to CSI reports of different unicast connections.

10. The method according to claim 8, wherein in a case that the CSI reports of the multiple unicast connections of the terminal correspond to one SR configuration, the multiple unicast connections correspond to one transmission prohibiting timer, and the one transmission prohibiting timer is used for any one of the following:
  starting the transmission prohibiting timer after an SR of any one unicast connection is successfully transmitted, and when the transmission prohibiting timer runs, prohibiting transmitting an SR corresponding to the unicast connection;
  starting the transmission prohibiting timer after an SR of any one unicast connection is successfully transmitted, and when the transmission prohibiting timer runs, prohibiting transmitting SRs corresponding to all unicast connections;
  starting the transmission prohibiting timer after an SR of a predetermined unicast connection is successfully transmitted, and when the transmission prohibiting timer runs, prohibiting transmitting an SR corresponding to the predetermined unicast connection; or
  starting the transmission prohibiting timer after an SR of a predetermined unicast connection is successfully transmitted, and when the transmission prohibiting timer runs, prohibiting transmitting SRs corresponding to all unicast connections; and/or,
  in a case that the CSI reports of the multiple unicast connections of the terminal correspond to multiple SR configurations, each unicast connection corresponds to a transmission prohibiting timer, wherein after an SR of a first unicast connection is successfully transmitted, a first transmission prohibiting timer corresponding to the first unicast connection is started, and when the first transmission prohibiting timer runs, an SR corresponding to the first unicast connection is prohibited from being transmitted, or, SRs corresponding to all unicast connections are prohibited from being transmitted, wherein the first unicast connection is any one of the multiple unicast connections.

11. A communication device, comprising:
a processor; and
a memory storing a computer program that is executable on the processor,
wherein the program, when executed by the processor, causes the communication device to:
receive configuration information from a network device,
wherein the configuration information comprises that channel state information (CSI) reports of multiple unicast connections of the terminal correspond to one scheduling request (SR) configuration, and the one SR configuration corresponds to multiple SR counters, or, the one SR configuration corresponds to one SR counter; and/or
the configuration information comprises that the CSI reports of the multiple unicast connections of the terminal correspond to multiple SR configurations, and the multiple SR configurations correspond to multiple SR counters,
wherein the program, when executed by the processor, further causes the communication device to: perform a first operation in a first case,
wherein the first operation comprises at least one of the following:
switching a resource allocation mode of the terminal into a terminal autonomous selection mode; or
switching a resource allocation mode of the terminal into a coexistence mode of a network scheduling mode and a terminal autonomous selection mode;
wherein the first case comprises any one of the following:
the one SR configuration corresponds to multiple SR counters, and a value of at least one of the multiple SR counters is greater than or equal to a quantity of maximum SR transmissions in a corresponding SR configuration;
the one SR configuration corresponds to one SR counter, and a value of one SR counter is greater than or equal to a quantity of maximum SR transmissions in a corresponding SR configuration; or
the multiple SR configurations correspond to multiple SR counters, and a value of at least one of the multiple SR counters is greater than or equal to a quantity of maximum SR transmissions in a corresponding SR configuration.

12. The communication device according to claim 11, wherein in a case that the one SR configuration corresponds to multiple SR counters, the multiple SR counters are respectively used for counting successfully transmitted SRs corresponding to CSI reports of different unicast connections; or
  in a case that the one SR configuration corresponds to one SR counter, the one SR counter is used for counting successfully transmitted SRs corresponding to the CSI reports of the multiple unicast connections; or
  in a case that the multiple SR configurations correspond to multiple SR counters, the multiple SR counters are respectively used for counting successfully transmitted SRs corresponding to CSI reports of different unicast connections.

13. The communication device according to claim 11,
wherein the first operation further comprises at least one of the following:
using a system message or a resource pool in radio resource control RRC dedicated signaling to transmit a CSI report;
transmitting indication information to the network device, wherein the indication information is used for indicating that a value of the at least one SR counter is greater than or equal to a quantity of maximum SR transmissions in a corresponding SR configuration, or indicating that a value of the one SR counter is greater than or equal to a quantity of maximum SR transmissions in a corresponding SR configuration;
triggering a random access channel (RACH) process and canceling all suspending SRs of the multiple unicast connections;
clearing a resource of a sidelink configured grant type 1 and/or a sidelink configured grant type 2 for transmitting a CSI report; or
using the resource of the sidelink configured grant type 1 and/or the sidelink configured grant type 2 to transmit the CSI report.

14. The communication device according to claim 11, wherein the program, when executed by the processor, further causes the communication device to:
- in a second case, trigger a RACH process and cancel a suspending SR of a unicast connection corresponding to a first SR counter, wherein a value of the first SR counter is greater than or equal to a quantity of maximum SR transmissions in a corresponding SR configuration,
- wherein the second case comprises any one of the following:
- the one SR configuration corresponds to multiple SR counters, and a value of at least one of the multiple SR counters is greater than or equal to the quantity of maximum SR transmissions in the corresponding SR configuration; or
- the multiple SR configurations correspond to multiple SR counters, and a value of at least one of the multiple SR counters is greater than or equal to the quantity of maximum SR transmissions in the corresponding SR configuration.

15. The communication device according to claim 11, wherein the program, when executed by the processor, further causes the communication device to:
- in a case that a timer has been started when a first CSI report is triggered, and when the timer expires, perform any one of the following:
- in a case that a media access control control element (MAC CE) of the first CSI report has been generated, canceling the first CSI report and clearing the MAC CE of the first CSI report; or
- in a case that no MAC CE of the first CSI report has been generated, performing at least one of the following: canceling the first CSI report, canceling an SR triggered by the first CSI report, or canceling a RACH process triggered by a suspending SR corresponding to the first CSI report.

16. The communication device according to claim 11, wherein the case that the CSI reports of the multiple unicast connections of the terminal correspond to multiple SR configurations comprises any one of the following:
- a CSI report of each unicast connection corresponds to a separate SR configuration; or
- a CSI report of at least one unicast connection corresponds to a separate SR configuration.

17. The communication device according to claim 11, wherein in a case that the CSI reports of the multiple unicast connections of the terminal correspond to one SR configuration, the multiple unicast connections correspond to one transmission prohibiting timer, and the one transmission prohibiting timer is used for any one of the following:
- starting the transmission prohibiting timer after an SR of any one unicast connection is successfully transmitted, and when the transmission prohibiting timer runs, prohibiting transmitting an SR corresponding to the unicast connection;
- starting the transmission prohibiting timer after an SR of any one unicast connection is successfully transmitted, and when the transmission prohibiting timer runs, prohibiting transmitting SRs corresponding to all unicast connections;
- starting the transmission prohibiting timer after an SR of a predetermined unicast connection is successfully transmitted, and when the transmission prohibiting timer runs, prohibiting transmitting an SR corresponding to the predetermined unicast connections; or
- the transmission prohibiting timer is started after an SR of a predetermined unicast connection is successfully transmitted, and when the transmission prohibiting timer runs, prohibiting transmitting SRs corresponding to all unicast connections; and/or,
- in a case that the CSI reports of the multiple unicast connections of the terminal correspond to multiple SR configurations, each unicast connection corresponds to one transmission prohibiting timer, wherein after an SR of a first unicast connection is successfully transmitted, a first transmission prohibiting timer corresponding to the first unicast connection is started, and when the first transmission prohibiting timer runs, an SR corresponding to the first unicast connection is prohibited from being transmitted, or, SRs corresponding to all unicast connections are prohibited from being transmitted, wherein the first unicast connection is any one of the multiple unicast connections.

18. A communication device, comprising:
- a processor; and
- a memory storing a computer program that is executable on the processor,
- wherein the program, when executed by the processor, causes the communication device to perform the scheduling request configuration method according to claim 8.

19. The communication device according to claim 18, wherein in a case that the one SR configuration corresponds to multiple SR counters, the multiple SR counters are respectively used for counting successfully transmitted SRs corresponding to CSI reports of different unicast connections; or,
- in a case that the one SR configuration corresponds to one SR counter, the one SR counter is used for counting successfully transmitted SRs corresponding to the CSI reports of the multiple unicast connections; or,
- in a case that the multiple SR configurations correspond to multiple SR counters, the multiple SR counters are respectively used for counting successfully transmitted SRs corresponding to CSI reports of different unicast connections.

20. The communication device according to claim 18, wherein in a case that the CSI reports of the multiple unicast connections of the terminal correspond to one SR configuration, the multiple unicast connections correspond to one transmission prohibiting timer, and the one transmission prohibiting timer is used for any one of the following:
- starting the transmission prohibiting timer after an SR of any one unicast connection is successfully transmitted, and when the transmission prohibiting timer runs, prohibiting transmitting an SR corresponding to the unicast connection;
- starting the transmission prohibiting timer after an SR of any one unicast connection is successfully transmitted, and when the transmission prohibiting timer runs, prohibiting transmitting SRs corresponding to all unicast connections;
- starting the transmission prohibiting timer after an SR of a predetermined unicast connection is successfully transmitted, and when the transmission prohibiting timer runs, prohibiting transmitting an SR corresponding to the predetermined unicast connection; or
- starting the transmission prohibiting timer after an SR of a predetermined unicast connection is successfully transmitted, and when the transmission prohibiting timer runs, prohibiting transmitting SRs corresponding to all unicast connections; and/or, in a case that the CSI reports of the multiple unicast connections of the terminal correspond to multiple SR configurations, each unicast connection corresponds to a transmission prohibiting timer, wherein after an SR of a first unicast connection is successfully transmitted, a first transmission prohibiting timer corresponding to the first unicast connection is started, and when the first transmission prohibiting timer runs, an SR corresponding to the first unicast connection is prohibited from being transmitted, or, SRs corresponding to all unicast connections are prohibited from being transmitted, wherein the first unicast connection is any one of the multiple unicast connections.

\* \* \* \* \*